United States Patent

Mabuchi et al.

[11] Patent Number: 5,157,431
[45] Date of Patent: Oct. 20, 1992

[54] INTERCHANGEABLE-LENS TYPE CAMERA SYSTEM

[75] Inventors: Toshiaki Mabuchi, Tokyo; Koji Takahashi, Kanagawa, both of Japan

[73] Assignee: Canon Kabushiki Kaisha, Tokyo, Japan

[21] Appl. No.: 642,129

[22] Filed: Jan. 14, 1991

Related U.S. Application Data

[63] Continuation of Ser. No. 373,789, Jun. 29, 1989, abandoned.

[30] Foreign Application Priority Data

Jul. 7, 1988 [JP] Japan .................. 63-170551

[51] Int. Cl.$^5$ ............................................. G03D 17/00
[52] U.S. Cl. ....................................................... 354/286
[58] Field of Search ............................................ 354/286

[56] References Cited

U.S. PATENT DOCUMENTS

| | | | |
|---|---|---|---|
| 4,477,164 | 10/1984 | Naikai et al. | 354/286 |
| 4,540,262 | 9/1985 | Nakai et al. | 354/286 X |
| 4,724,453 | 9/1988 | Hamano et al. | 354/286 X |
| 4,803,509 | 2/1989 | Nakai et al. | 354/286 X |
| 4,860,113 | 8/1989 | Miyamoto et al. | 354/286 X |

Primary Examiner—Michael L. Gellner
Attorney, Agent, or Firm—Robin, Blecker, Daley & Driscoll

[57] ABSTRACT

An interchanageable-lens type camera system having a camera body and a lens unit includes an actuator disposed on the side of the lens unit, a control signal source disposed on the side of at least one of the camera body and the lens unit to control the actuator, an identification data forming circuit for forming identification data indicative of the presence, kind or absence of the control signal source in the camera body or the lens unit, and a communication part for transmitting the identification data between the camera body and the lens unit, wherein a control signal produced by the control signal source is supplied to the actuator on the basis of the identification data.

51 Claims, 9 Drawing Sheets

INTERCHANGEABLE-LENS TYPE CAMERA SYSTEM

This is a continuation application under 37 CFR 1.62 of prior application Ser. No. 373,789, filed Jun. 29, 1989, now abandoned.

BACKGROUND OF THE INVENTION

1. Field of the Invention

This invention relates to an interchangeable-lens type camera system and more particularly to a system called an electronic mount system which performs data communication between a lens unit and a camera body.

2. Description of the Related Art

The electronic mount system has never been arranged to have units of the same function connected to the two ends of its data communication channel.

Figure 1:
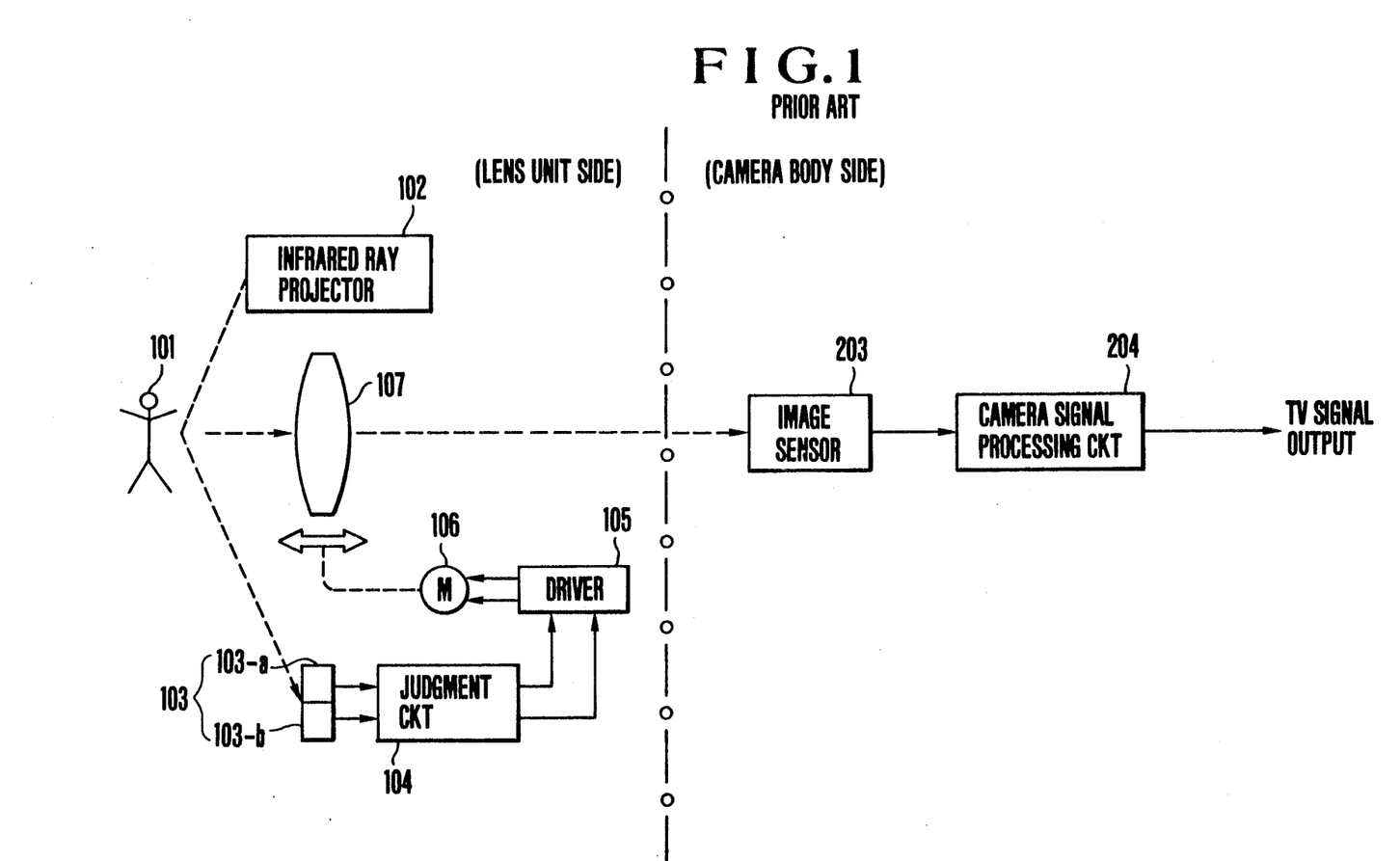
FIGS. 1 and 2 show the conventional systems.

For example, an automatic focusing (hereinafter referred to as "AF") device, the interchangeable-lens type camera system is arranged to have the AF device connected to only one of the two ends of the data communication channel. The AF device is never disposed on both the lens unit side and the camera body side. An example wherein an infrared ray type AF device is completely set only within the lens unit is arranged as described below with reference to FIG. 1 of the accompanying drawings:

An infrared ray projector 102 projects infrared rays onto an object 101 to be photographed. This gives reflected rays, which are received by an infrared ray sensor 103. A judgement circuit 104 judges a focusing state of the lens 107 according to the output of the sensor 103. If the lens 107 is in focus, no correction is required. If not, the judgment circuit 104 supplies a driver 105 with a signal indicating the direction and degree of correction required according to a near focus or far-focus state as determined by the judgment circuit 104. In accordance with the output of the judgment circuit 104, the driver 105 produces a control signal. A motor 106 is driven by the control signal to shift the position of the lens 107 to an in-focus position. As a result, an image is formed in an in-focus state on an image sensor 203 which is disposed on the side of the camera body.

Figure 2:
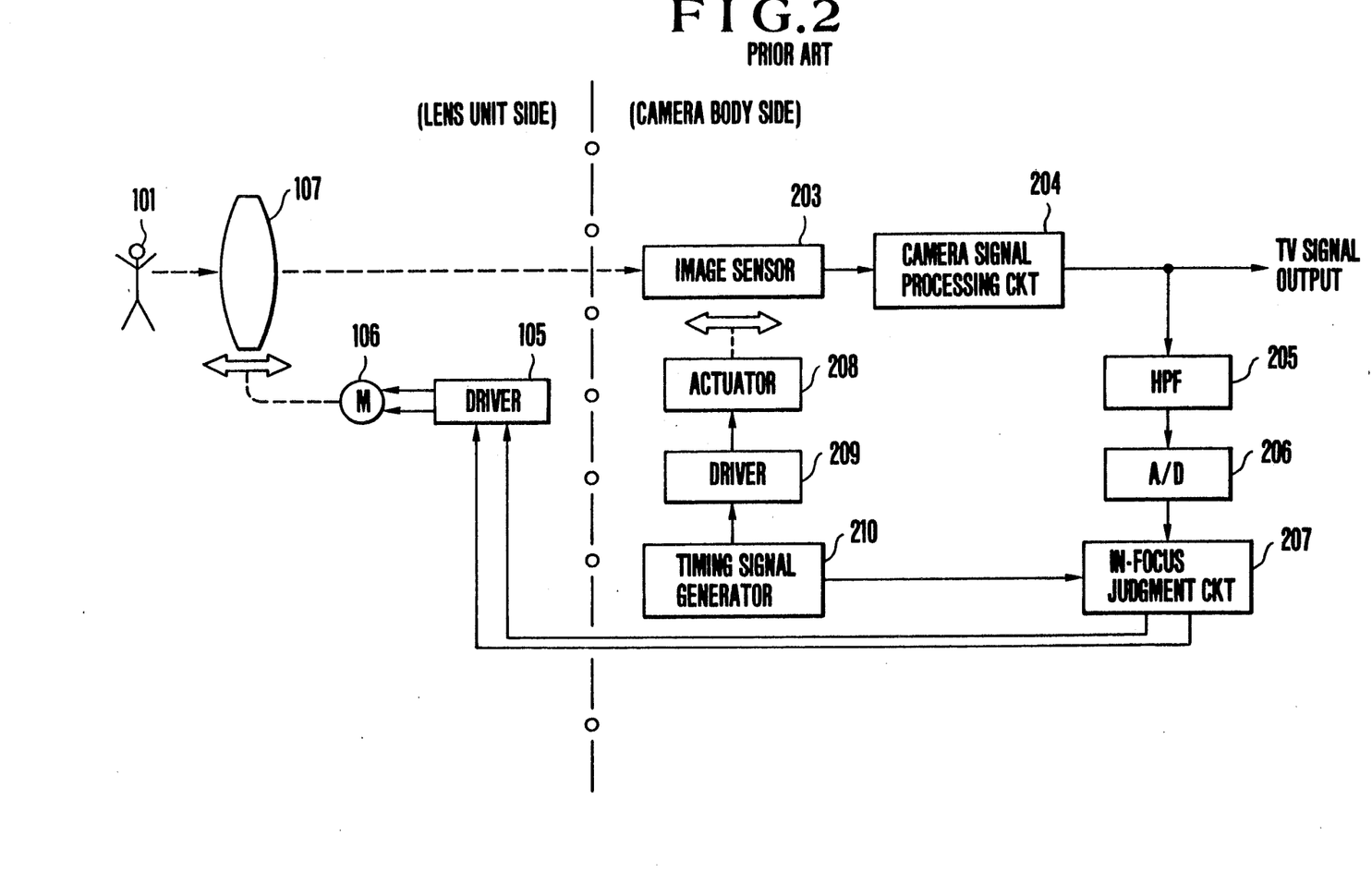

The examples of conventional AF arrangement include a TV-signal-using AF (hereinafter referred to as TV-AF) arrangement wherein the in-focus determining device is disposed on the side of the camera body as shown in FIG. 2. The TV-AF arrangement is as follows: A lens 107 forms, on an image sensor 203 disposed on the side of the camera body, an image of light coming from an object 101. As a result, a camera signal processing circuit 204 generates and outputs a TV signal. A high-pass filter 205 extracts from the output of the camera signal processing circuit 204 only a high-fineness signal which is obtainable in a large quantity under an in-focus condition. An analog-to-digital (A/D) converter 206 converts the high-fineness signal into a digital signal. The digital signal is used by an in-focus judgment circuit 207 for determining a focusing state.

Further, for finding the direction in which a defocusing state is obtained, an actuator 208 which is made of a bimorph plate or the like is driven by a driver 209 in accordance with a signal of a frequency which is several times as high as a frame frequency signal generated by a timing signal generator 210. The image sensor 203 is vibrated and moved to a minute extent back and forth from a focal plane to enable the in-focus judgment circuit 207 to make a discrimination between a near-focus state and a far-focus state. The result of discrimination is transmitted to a driver 105 which is disposed on the side of the lens unit. The driver 106 then shifts the position of the lens 107 to an in-focus position according to the result of discrimination.

The interchangeable-lens type camera system can be arranged without any problem with an in-focus judgment device disposed only on one of the lens unit side and the camera body side as described above. However, in the light of the latitude of system arrangement as a whole, the conventional system has lacked expansibility.

SUMMARY OF THE INVENTION

The present invention is directed to the solution of the above-stated problem of the prior art. It is therefore an object of the invention to provide an interchangeable-lens type camera system which is capable of solving this problem by allowing a great degree of latitude in selecting a plurality of functions in combinations in any manner as desired.

To attain this object, an interchangeable-lens type camera system arranged as an embodiment of the invention comprises: an actuator which is disposed on the side of a lens unit; a control signal source which is arranged on the side of at least one of a camera body and the lens unit to control the actuator; forming means for forming identification data indicative of the presence, absence or kind of the control signal source; and communication means for transmitting the identification data through a communication channel either to the camera body or to the lens unit which does not include the identification data forming means.

In the embodiment, the communication means is arranged to transmit, either to the lens unit side or to the camera body side, information on the kind of the control function possessed by the other side. This enables at least one of the two sides to know the conditions of both the lens unit and the camera body. This permits a decision to be made as to which of the control functions of the two sides is to be used. Therefore, data can be selected in such a way as to have the actuator disposed on the side of the lens unit driven on the basis of a pertinent control signal produced either on the side of the lens unit or on the side of the camera body.

The above and other objects and features of the invention will become apparent from the following connection with the accompanying drawings.

DETAILED DESCRIPTION OF THE PREFERRED EMBODIMENTS

Figure 3A:
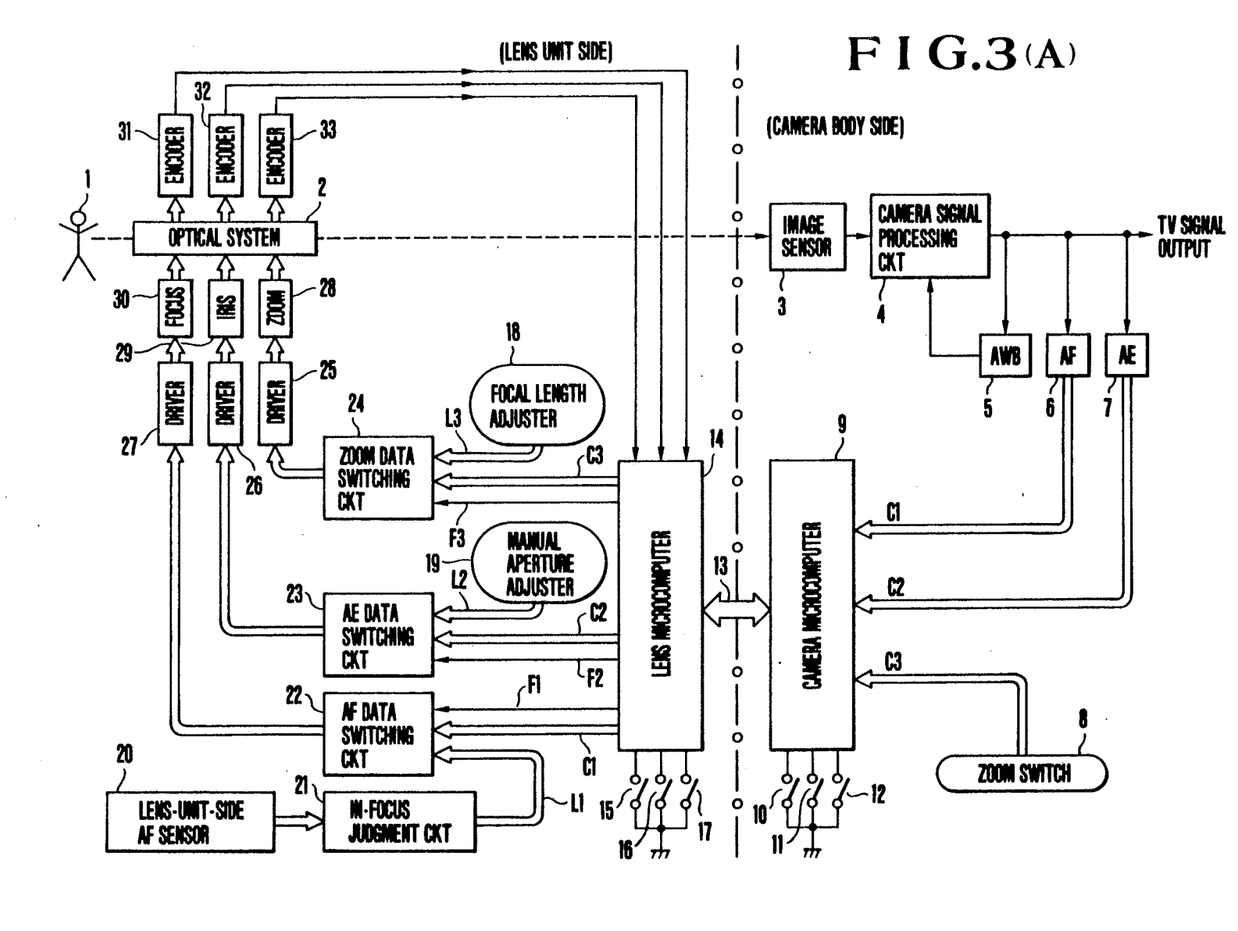
FIG. 3(A) is a block diagram showing the arrangement of a first embodiment of the invention.
Figure 3B:
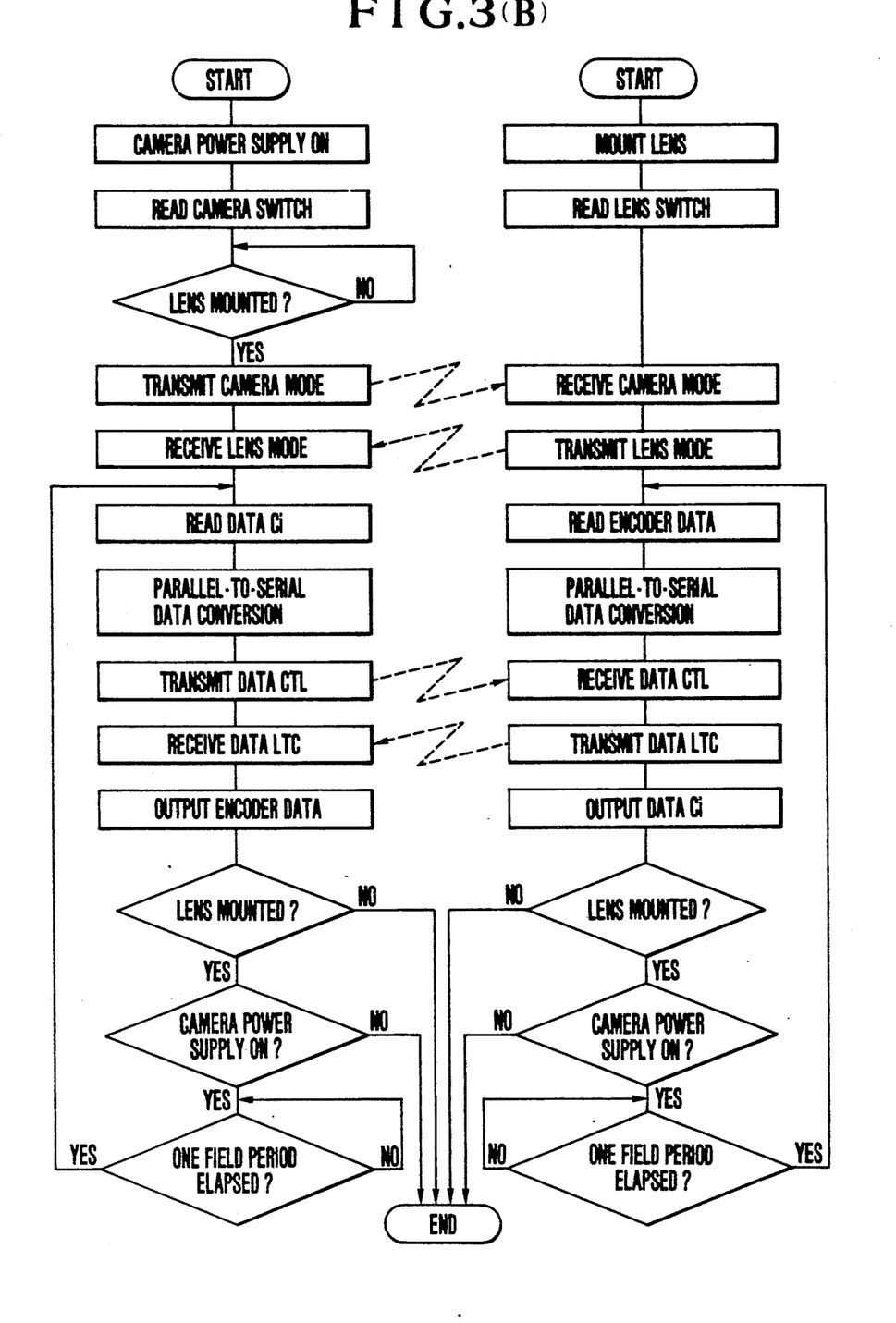
FIG. 3(B) is a flow chart showing the operation of the first embodiment.

Referring to FIGS. 3(A) and 3(B), the whole camera system arrangement of a first embodiment of the invention is described as follows: FIG. 3(A) shows the camera body of the system on the right-hand side of a one-dot chain line vertically drawn in the middle part. The lens unit of the system is shown on the left-hand side. The light of an object 1 is imaged on an image sensor 3 by an optical system 2. The output of the image sensor 3 is converted into a TV signal by a camera signal processing circuit 4. The TV signal is output from the system. Meanwhile, the TV signal is also used by various automatic adjustment devices for AWB (automatic white balance control), AF (automatic focusing) and AE (automatic exposure control) which are performed in known manners.

For these automatic adjustment devices, control signals are formed by and output from control signal forming parts 5, 6 and 7. Among these control signals, a control signal for controlling the color balance of the TV signal is supplied to the camera signal processing circuit 4. Control signals C1 and C2 are supplied to a microcomputer 9 disposed on the camera body side. Meanwhile, another control signal C3 is generated by a zoom switch 8 which is provided for setting the focal length of the optical system 2. The control signal C3 is also supplied to the microcomputer 9.

Switches 10, 11 and 12 are arranged to be turned on and off according to the presence or absence of the AE, AF and zoom control functions on the side of the camera body. Information on the open- and closed-states of these switches 10, 11 and 12 is supplied as identification data to the microcomputer 9. These switches may be replaced with a ROM or the like. The identification data and control signals are transferred as communication data from the camera body side to the lens unit side via a data communication channel 13.

The data communication channel 13 is connected to a microcomputer 14 which is disposed on the side of the lens unit. The microcomputer 14 is arranged to receive all the communication data obtained on the side of the lens unit. Further, the microcomputer 14 receives, like the camera microcomputer 9, information on the open- or closed-states of switches 15, 16 and 17 which are provided for the AE, AF and zoom functions on the side of the lens unit.

The control signals C1, C2 and C3 which have been supplied to the camera microcomputer 9 and sent to the lens microcomputer 14 are supplied further from the latter to data switching circuits 22, 23 and 24, respectively.

FIG. 3(B) shows in a flow chart the operation of the embodiment shown in FIG. 3(A). On the side of the camera body, the microcomputer 9 first reads the state of each switch of the camera body to find a camera mode when the power supply for the camera body is switched on. After the lens unit is mounted on the camera body, the camera mode is transmitted to the lens unit in the form of switching flags F1, F2 and F3 through the communication channel. Following this, a lens mode is received from the lens unit. After that in the next step, data Ci (i: 1, 2 or 3) is read. The data is then parallel-to-serial converted into data CTL. The data CTL is transmitted to the lens unit. Further, data LTC which is likewise formed on the side of the lens unit is received by the camera body. After receipt of the data LTC from the lens unit, various control actions are performed while producing the data of encoders. Then, after confirmation of the mounted state of the lens unit, a check is made to see if the camera power supply is on. If so, the flow of operation comes back to the step of reading the data Ci after waiting for the lapse of one field period. Further, if the lens unit is dismounted or if the camera power supply is found to have been turned off, this routine comes to an end.

On the side of the lens unit, the state of each switch of the lens unit is read as a lens mode after the lens unit is mounted on the camera body. The lens mode data is transmitted to the camera body after receipt of the camera mode data. After this, the data of encoders is read and is parallel-to-serial converted. Then, after receipt of the data CTL from the camera body, the data LTC is transmitted to the camera body. Further, the data Ci is produced. A check is made if the lens unit is still mounted on the camera body. If so, a check is made to see if the camera power supply is still on. If so, the flow waits for the lapse of one field period. After the lapse of one field period, the encoder data is again read. If the lens unit is dismounted or if the camera power supply is turned off, the routine comes to an end.

An AF data switching circuit 22 is arranged to receive, for example, the control signal C1 and a focus control signal L1 which is formed by an in-focus judgment circuit 21 according to the output of an AF sensor 20 disposed on the side of the lens unit. The AF data switching circuit 22 then selects one of these input signals C1 and L1 in accordance with the switching flag F1 and supplies it to a driver 27. An AF actuator 30 is arranged to control the optical system 2 according to the output of the driver 27 to bring the optical system 2 to an in-focus position. The switching flag F1 is arranged to be set either at a high (H) level state or at a low (L) level state according to the open or closed state of the switch 11 which is disposed on the side of the camera body and that of the switch 16 which is disposed on the side of the lens unit.

If the system is most simply arranged to give priority to the lens unit, for example, the state of the switching flag F1 is determined solely in accordance with the position of the switch 16 irrespectively of that of the switch 11. In a case where the switch 16 is open, the flag F1 is at H and the AF data switching circuit 22 selects the control signal C1. If the switch 16 is closed, the switching flag F1 is at L and the control signal L1 is selected. This arrangement of course may be variously changed as desired.

An AE data switching circuit 23 is arranged to receive, for example, the control signal C2 and another control signal L2 which is output from a manual aperture adjuster 19 disposed on the side of the lens unit. The AE data switching circuit 23 selects one of these control signals C2 and L2 according to the switching flag F2 and supplies the control signal selected to a driver 26. An AE actuator 29 is arranged to control the optical system 2 to bring its aperture to the optimum aperture position according to the output of the driver 26.

The switching flag F2 is set either at a high (H) level or at a low (L) level according to the open or closed state of the switch 10 disposed on the side of the camera body and that of the switch 15 disposed on the side of the lens unit. The switch 15 is arranged to be normally open to select the control signal C2 and the control is left to be performed solely on the side of the camera body. However, assuming that the system is most simply arranged to give priority to the lens unit, in a case where the manual aperture adjuster 19 is operated, the switch 15 is closed and the manual aperture control signal L2 is selected instead of the control signal C2.

A zoom data switching circuit 24 is arranged to receive, for example, the control signal C3 and a control signal L3 which is output from a focal length adjuster 18 disposed on the side of the lens unit. The zoom data switching circuit 24 selects one of the control signals C3 and L3 according to the switching flag F3. The control signal thus selected is supplied to a driver 25. A zoom actuator 28 is arranged to control the optical system 2 to adjust its focal length according to the output of the driver 25. The switching flag F3 is set either at a high (H) level or at a low (L) level according to the open or closed state of the switch 12 disposed on the side of the camera body and that of the switch 17 disposed on the side of the lens unit.

If the system is most simply arranged to give priority to a later pushed switch, for example, switch 12 or 17 is closed for a period of time during which a lens zooming operation is performed either on the camera body side or on the lens unit side according to the system arrangement. Then, the zoom data switching circuit 24 selects either the control signal C3 or the other control signal L3 according to the closed switch. In a case where both the switches 12 and 17 are closed, the data of the signal corresponding to the switch pushed or operated later than the other switch is selected.

Further, the optical system 2 is provided with encoders 31, 32 and 33 for confirmation of the operating states of the actuators 30, 29 and 28. The encoder 31 is provided for detection of the focus position of the optical system 2. The encoder 32 is provided for detection of the aperture position. The encoder 33 is provided for detection of the focal length position resulting from the zooming operation. The data or result of detection is supplied to the lens microcomputer 14 from the encoders. The encoder data is not only used for the internal control of the lens unit but also transmitted to the camera microcomputer 9 as necessary. Upon receipt of the data, the microcomputer 9 uses it for an AF or AE control operation to be performed on the side of the camera body.

Figure 4A:
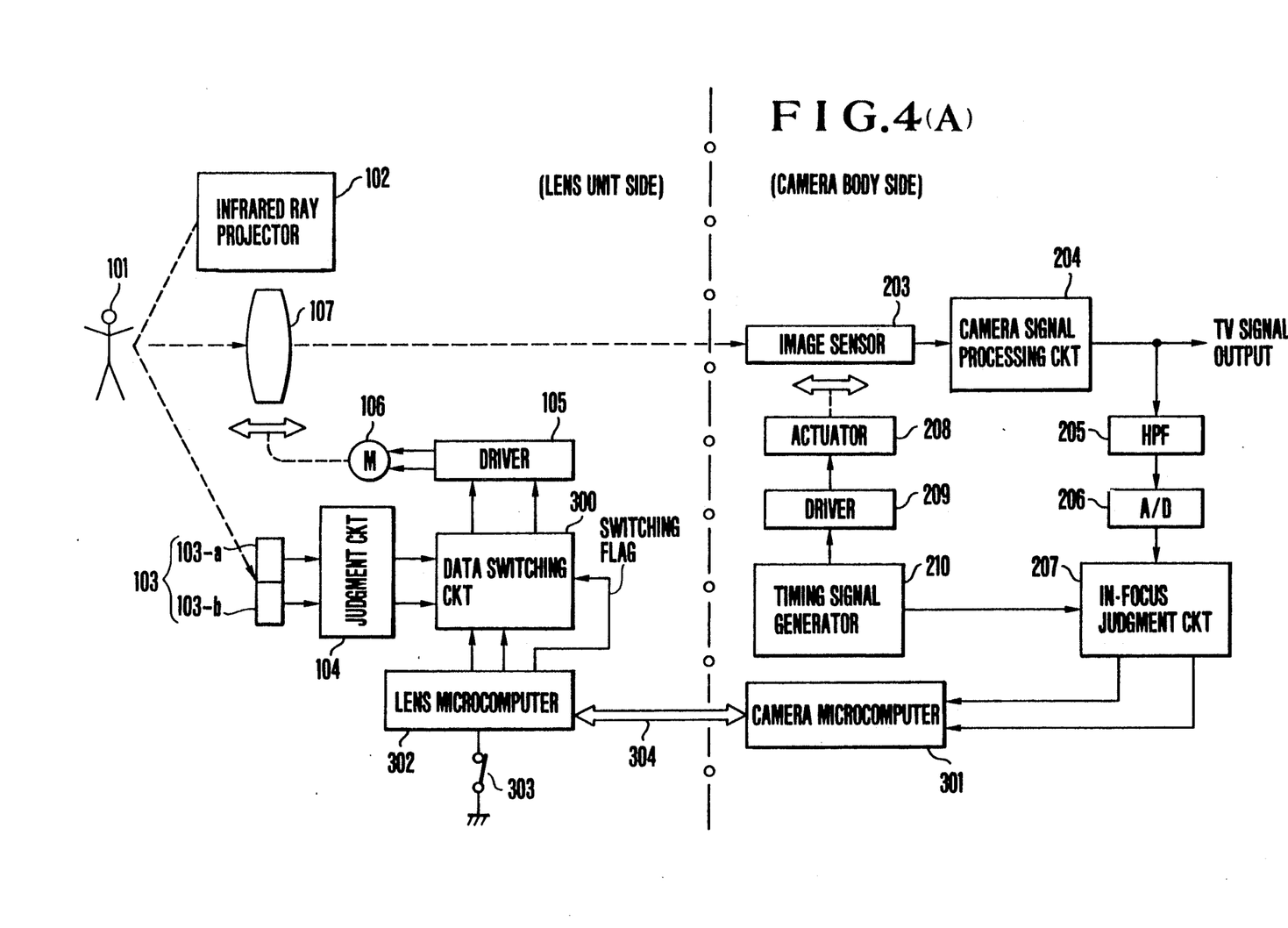
FIG. 4(A) is a block diagram showing the arrangement of a second embodiment of the invention.
Figure 4B:
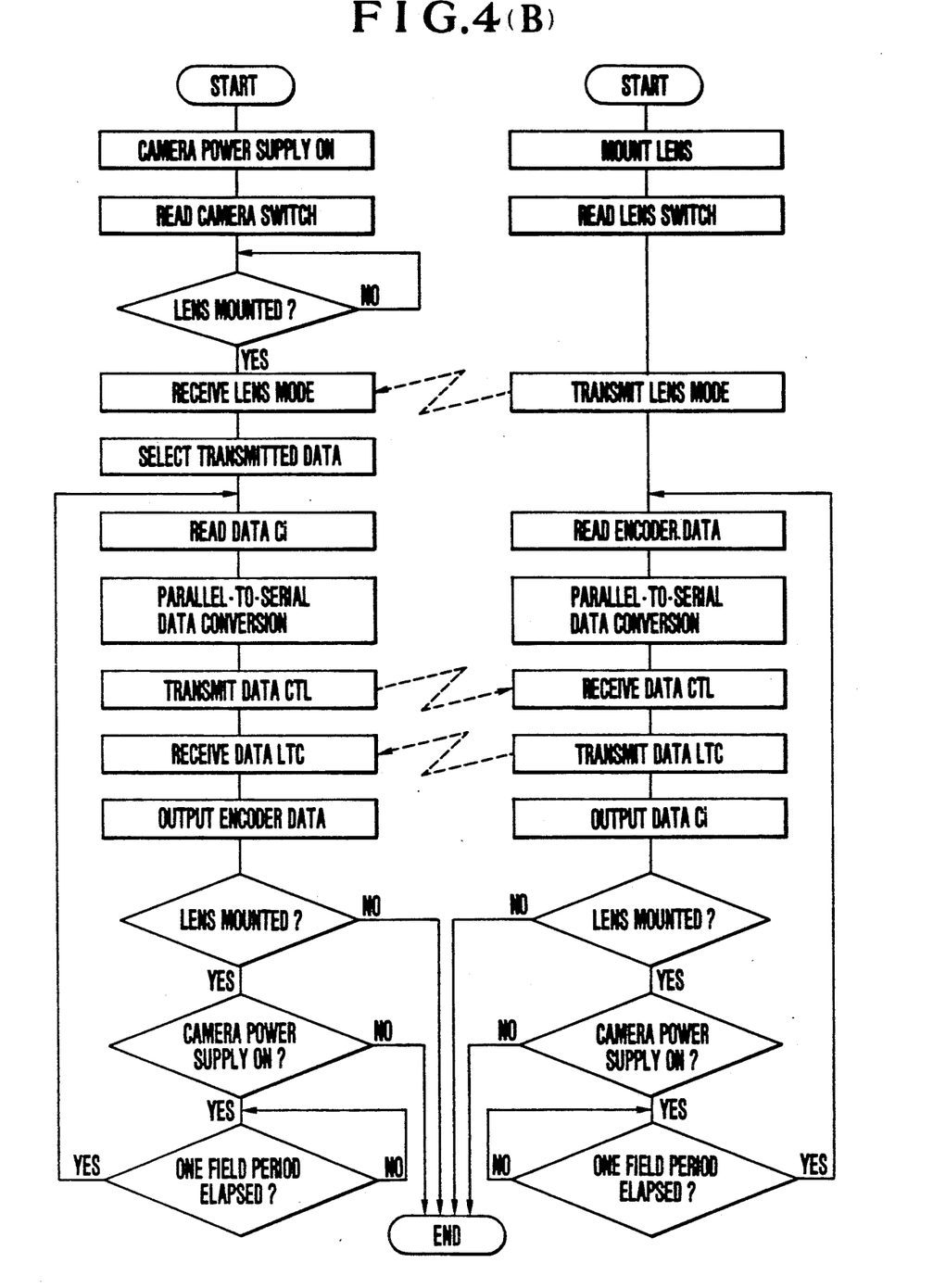
FIG. 4(B) is a flow chart showing the operation of the second embodiment.

The interchangeable-lens type camera system which is of the kind performing data communication and arranged as the first embodiment of this invention selects the data of a plurality of control data sources in the manner as described in the foregoing. The details of data selection are further described below with the range of description limited to the AF operation:

FIGS. 4(A) and 4(B) show in a block diagram and a flow chart the arrangement and the operation of a second embodiment of the invention. In this case, an infrared ray type AF arrangement is disposed on the side of a lens unit while a TV-AF arrangement is disposed on the side of a camera body. In FIG. 4(A), the blocks which are the same as those of the conventional camera systems described in the foregoing are indicated by the same reference numerals as in FIGS. 1 and 2.

The image of an object 101 to be photographed is arranged to be converted into a TV signal by an image sensor 203 and a camera signal processing circuit 204. Meanwhile, for an AF action, information which is obtained from the TV signal through a high-pass filter (HPF) 205 and an analog-to-digital (A/D) converter 206 and information on the defocus direction obtained by an actuator 208, a driver 209 and a timing signal generator 210 are supplied to an in-focus judgment circuit 207. The in-focus judgment circuit 207 forms a focus control signal on the basis of these inputs. This control signal is supplied to a microcomputer 301 which is disposed on the side of the camera body. The microcomputer 301 then sends the control signal to a communication channel 304. Data is transmitted from the camera body to the lens unit via lens mount contacts. On the side of the lens unit, another microcomputer 302 receives the data. The microcomputer 302 forms, on the basis of the data received, a composite control signal from the control signal output from the in-focus judgment circuit 207 disposed on the side of the camera body. The composite control signal is supplied to a data switching circuit 300. Further, for detection of the presence of the AF function on the side of the lens unit, a switch 303 is in a closed state so that a switching flag which is provided for data selection control is at a high (H) level. Because of this, the control data output from the camera body is not selected. The data switching circuit 300 thus supplies a driver 105 with a control signal which has been output from an AF judgment circuit 104 disposed on the side of the lens unit.

As a result, the infrared ray type AF arrangement which is arranged in the same manner as in the conventional system described in the foregoing is allowed to independently operate.

Processing functions which may be added as necessary include a function of suspending the transmission of control data. For this purpose, information on the above-stated switching flag is transmitted via the communication channel 304 to the camera microcomputer 301. In response to this switching flag, the camera microcomputer 301 stops transmitting the control data output from the in-focus judgment circuit 207.

Figure 5A:
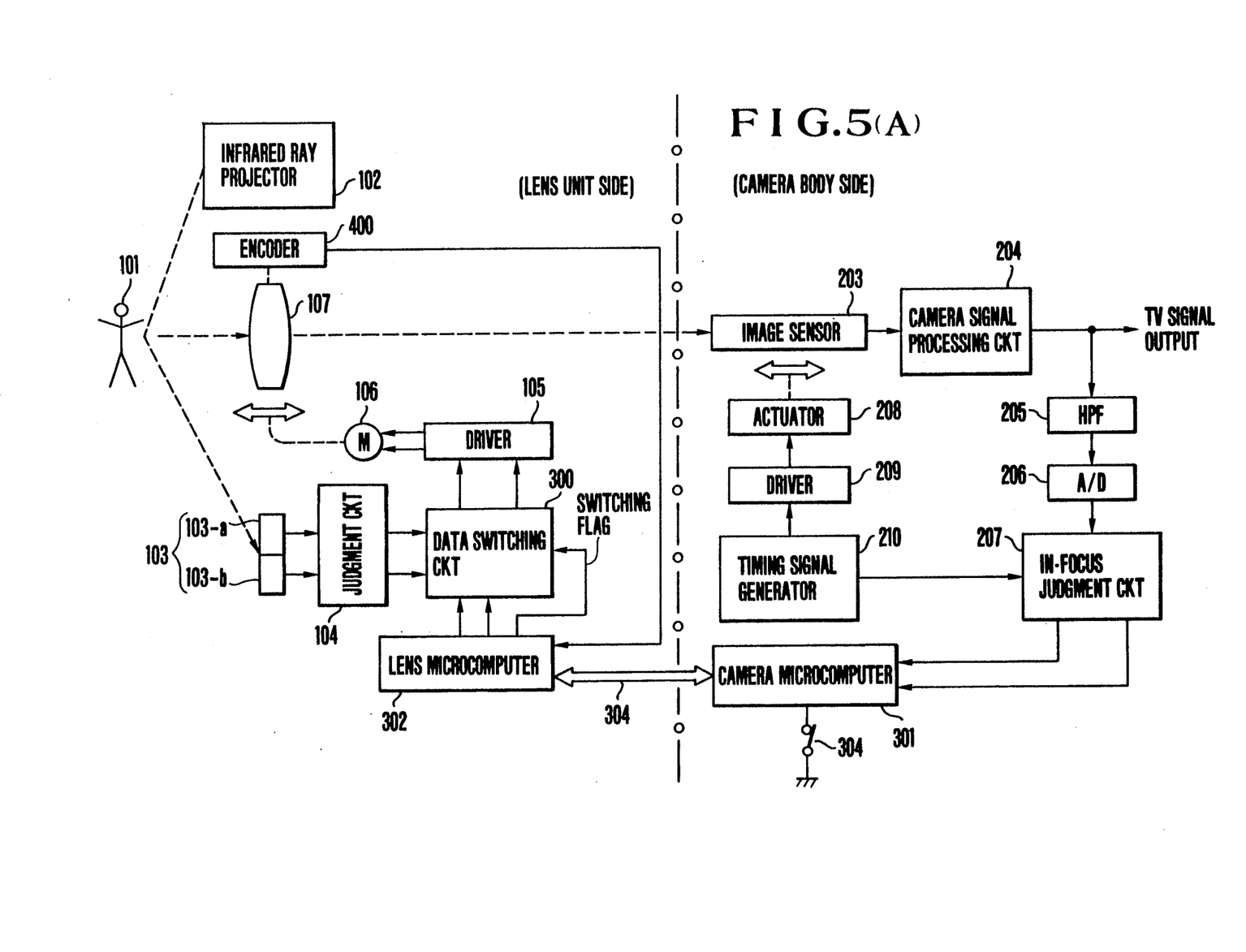
FIG. 5(A) is a block diagram showing the arrangement of a third embodiment of the invention.
Figure 5B:
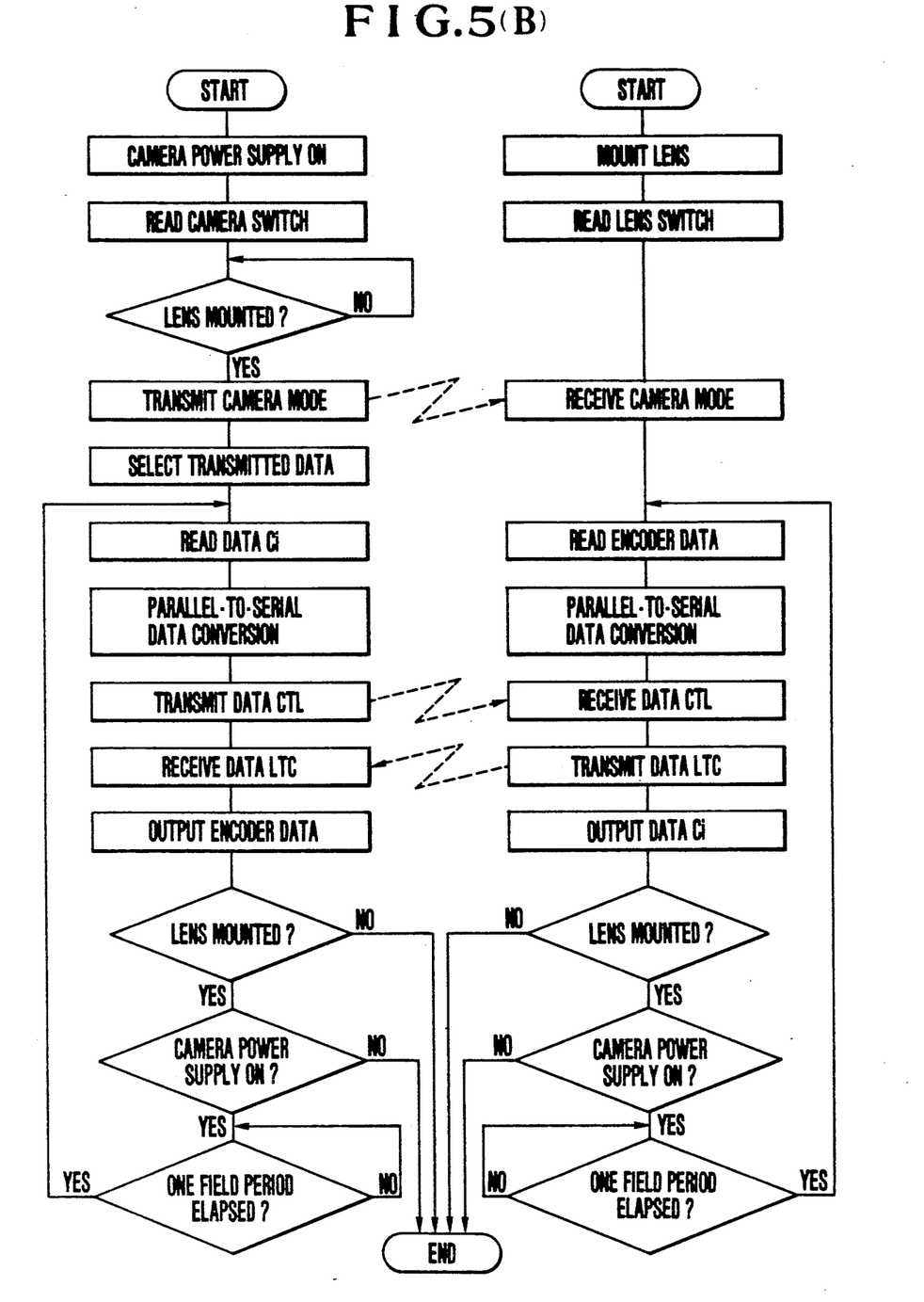
FIG. 5(B) is a flow chart showing the operation of the third embodiment.
Figure 6:
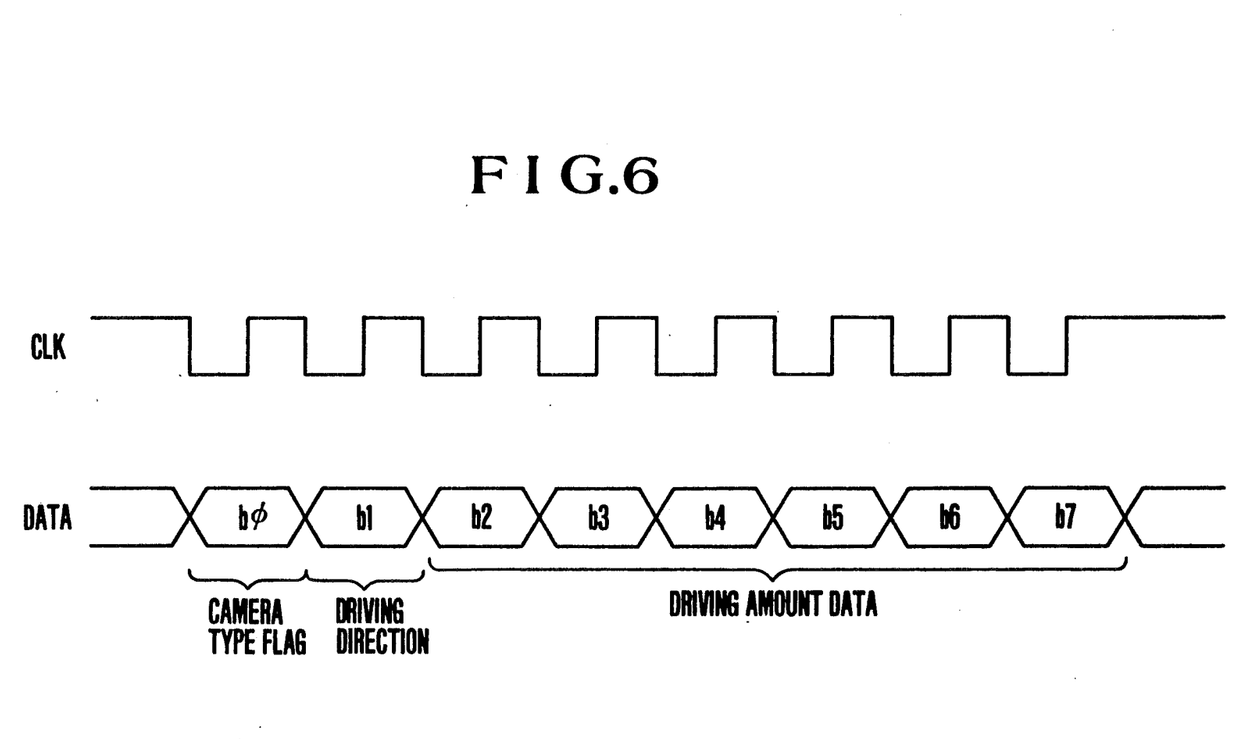
FIG. 6 shows by way of example the serial data communication performed by the third embodiment.

Next, referring to FIG. 5(A) which is a block diagram and FIG. 5(B) which is a flow chart, a third embodiment of the invention is described as follows: In a case where a lens unit having an AF system completely arranged within the lens unit is combined with a camera body including an AF process (computing function) performing arrangement, the AF process on the side of the camera body might have priority (because of a special function, etc.) over the AF action to be completed within the lens unit in the event of an AF mode requiring use of a video signal or the like for the AF action. The third embodiment is a camera system of such a combination. It requires data of an encoder 400 for performing a total system AF action by driving a motor 106 disposed within the lens unit according to the output of an in-focus judgment circuit 207 disposed within the camera body. The third embodiment further includes a data switching circuit 300 for switching over data which indicates the direction and degree of driving output from the judgment circuit 104 of the AF system of the lens unit to data output from the judgment circuit 207 in a case where the motor 106 is to be driven in the direction and to a degree as determined on the side of the camera body. Further, in order to determine a selection to be made by the data switching circuit 300 between the data of the lens unit and that of the camera body, the lens unit must know whether or not the camera body has the AF process performing function. To meet that requirement, data which is to be serially transmitted from the camera body to the lens unit has a specific bit $b\phi$ thereof, for example, arranged to indicate whether the camera body has the AF process (computing) function or not according to the on-state or off-state of a switch 304, as shown in FIG. 6. If the lens unit is to be driven on the basis of this AF processing data coming from the camera body, this specific bit bφ is set at "1". Further, in cases where the camera body does not have the AF process function or where it is desired to use a TTL process with the AF process function provided on the side of the lens unit although the camera body has the AF process function the specific bit bφ is set at "0". If the specific bit bφ of the data is set at "1", the lens unit cuts off the other data output from the judgment circuit 104 of the lens unit and allows the data switching circuit 300 to select the serial data coming from the camera body to use it for driving the motor 106 in the direction and to the degree as determined according to the serial data received from the camera body.

Further, if the specific bit is set at "0", the data switching circuit 300 oppositely makes the data selection. With the data switching circuit 300 arranged in this manner, the lens unit is capable of allowing system with the lens unit mounted on a camera body of any kind. FIG. 6 shows an example of the above-stated serial data.

In accordance with this invention, the conditions of both the lens unit and the camera body is detectable by one of them. This enables the camera system to accurately determine the use of the control function of one or that of the other.

It is an advantage of the invention that data selection can be made according to the result of the determination in such a way as to drive the actuator of the lens unit on the basis of either the control signal of the lens unit or that of the camera body.

The range of functions of a camera system has been limited in the stage of designing the mount of the system according to the conventional arrangement. Whereas, the range of the functions of the invented camera system is expansible later to a great extent.

What is claimed is:

1. An interchangeable-lens type camera system including a camera body and a lens unit, comprising:
   (a) an actuator provided in said lens unit;
   (b) a first control signal source provided in said lens unit, for producing a first control signal to control said actuator;
   (c) a second control signal source provided in said camera body, for producing a second control signal to control said actuator;
   (d) identification data forming means provided in at least one of said camera body and said lens unit, for forming and outputting identification data indicative of the presence, kind or nonuse of said first control signal source or said second control signal source;
   (e) communication means for transmitting said identification data between said camera body and said lens unit; and
   (f) selection means provided in said lens unit, for selecting one of said first control signal and said second control signal on the basis of said identification data and for supplying the selected one to said actuator.

2. A camera system according to claim 1, wherein said identification data forming means includes a switch.

3. A camera system according to claim 1, wherein said identification data forming means includes a ROM.

4. A camera system according to claim 1, wherein said first control signal and said second control signal each represent focusing information.

5. A camera system according to claim 1, wherein said first control signal and said second control signal each represent aperture information.

6. A camera system according to claim 1, wherein said first control signal and said second control signal each represent zoom information.

7. An interchangeable-lens type camera system including a camera body and a lens unit, comprising:
   (a) an actuator provided in said lens unit;
   (b) a control signal source provided in one of said camera body and said lens unit, for producing a control signal to control said actuator;
   (c) identification data forming means provided in at least one of said camera body and said lens unit, for forming and outputting identification data indicative of the presence or absence of said control signal source in said camera body or said lens unit;
   (d) communication means for transmitting said identification data between said camera body and said lens unit; and
   (e) supply means for supplying said control signal to said actuator on the basis of said identification data.

8. A camera system according to claim 7, wherein said identification data forming means includes a switch.

9. A camera system according to claim 7, wherein said identification data forming means includes a ROM.

10. A camera system according to claim 7, wherein said control signal represents focusing information.

11. A camera system according to claim 7, wherein said control signal represents aperture information.

12. A camera system according to claim 7, wherein said control signal represents zoom information.

13. A lens unit adapted to be mounted on a camera body, comprising:
   (a) an actuator;
   (b) a first control signal source for producing a first control signal to control said actuator;
   (c) identification data forming means for forming and outputting first identification data indicative of the presence or kind of said first control signal source;
   (d) communication means for receiving from said camera body, second identification data indicative of the presence, kind or absence of a second control signal source in said camera body adapted for producing a second control signal to control said actuator, said communication means receiving said second control signal from said camera body when said second identification data is indicative of the presence or kind of said second control signal source in said camera body; and
   (e) selection means for selecting one of said first control signal and said second control signal on the basis of said first identification data and said second identification data and for supplying the selected one to said actuator.

14. A lens unit according to claim 13, wherein said communication means transmits said first identification data to said camera body.

15. A lens unit according to claim 13, wherein said identification data forming means includes a switch.

16. A lens unit according to claim 13, wherein said identification data forming means includes a ROM.

17. A lens unit according to claim 13, wherein said first control signal and said second control signal each represent focusing information.

18. A lens unit according to claim 13, wherein said first control signal and said second control signal each represent aperture information.

19. A lens unit according to claim 13, wherein said first control signal and said second control signal each represent zoom information.

20. A lens unit adapted to be mounted on a camera body, comprising:
 (a) an actuator;
 (b) a first control signal source for producing a first control signal to control said actuator;
 (c) communication means for receiving from said camera body, identification data indicative of the presence, kind or absence of a second control signal source in said camera body adapted for producing a second control signal to control said actuator, said communication means receiving said second control signal from said camera body when said identification data is indicative of the presence or kind of said second control signal source in said camera body; and
 (d) selection means for selecting one of said first control signal and said second control signal on the basis of said identification data and for supplying the selected one to said actuator.

21. A lens unit according to claim 20, wherein said first control signal and said second control signal each represent focusing information.

22. A lens unit according to claim 20, wherein said first control signal and said second control signal each represent aperture information.

23. A lens unit according to claim 20, wherein said first control signal and said second control signal each represent zoom information.

24. A lens unit adapted to be mounted on a camera body, comprising:
 (a) an actuator;
 (b) identification data forming means for forming and outputting identification data indicative of the presence, kind or absence of a control signal source in said lens unit adapted for producing a control signal to control said actuator; and
 (c) communication means for transmitting said identification data to said camera body.

25. A lens unit according to claim 24, wherein said identification data forming means includes a switch.

26. A lens unit according to claim 24, wherein said identification data forming means includes a ROM.

27. A lens unit according to claim 24, wherein said control signal represents focusing information.

28. A lens unit according to claim 24, wherein said control signal represents aperture information.

29. A lens unit according to claim 24, wherein said control signal represents zoom information.

30. A camera body adapted to have a lens unit mounted thereon, comprising:
 (a) a first control signal source for producing a first control signal to control an actuator provided in said lens unit;
 (b) identification data forming means for forming and outputting first identification data indicative of the presence or kind of said first control signal source in said camera body; and
 (c) communication means for transmitting said first control signal and said first identification data to said lens unit.

31. A camera body according to claim 30, wherein said communication means receives from said lens unit, second identification data indicative of the presence, kind or absence of a second control signal source in said lens unit adapted for producing a second control signal to control said actuator.

32. A camera body according to claim 31, wherein said communication means stops transmitting said first control signal to said lens unit when said second identification data is indicative of the presence or kind of said second control signal source in said lens unit.

33. A camera body according to claim 30, wherein said identification data forming means includes a switch.

34. A camera body according to claim 30, wherein said identification data forming means includes a ROM.

35. A camera body according to claim 30, wherein said first control signal represents focusing information.

36. A camera body according to claim 30, wherein said first control signal represents aperture information.

37. A camera body according to claim 30, wherein said first control signal represents zoom information.

38. A camera body according to claim 31, wherein said second control signal represents focusing information.

39. A camera body according to claim 31, wherein said control signal represents aperture information.

40. A camera body according to claim 31, wherein said second control signal represents zoom information.

41. A camera body adapted to have a lens unit mounted thereon, comprising:
 (a) a first control signal source for producing a first control signal to control an actuator provided in said lens unit; and
 (b) communication means for transmitting said first control signal to said lens unit and for receiving from said lens unit, identification data indicative of the presence, kind or absence of a second control signal source in said lens unit adapted for producing a second control signal to control said actuator.

42. A camera body according to claim 41, wherein said communication means stops transmitting said first control signal to said lens unit when said identification data is indicative of the presence or kind of said second control signal source in said lens unit.

43. A camera body according to claim 41, wherein said first control signal and said second control signal each represent focusing information.

44. A camera body according to claim 41, wherein said first control signal and said second control signal each represent aperture information.

45. A camera body according to claim 41, wherein said first control signal and said second control signal each represent zoom information.

46. A camera body adapted to have a lens unit mounted thereon, comprising:
 (a) identification data forming means for forming and outputting identification data indicative of the presence, kind or absence of a control signal source in said camera body adapted for producing a control signal to control an actuator provided in said lens unit; and
 (b) communication means for transmitting said identification data to said lens unit.

47. A camera body according to claim 46, wherein said identification data forming means includes a switch.

48. A camera body according to claim 46, wherein said identification data forming means includes a ROM.

49. A camera body according to claim 46, wherein said control signal represents focusing information.

50. A camera body according to claim 46, wherein said control signal represents aperture information.

51. A camera body according to claim 46, wherein said control signal represents zoom information.

* * * * *

UNITED STATES PATENT AND TRADEMARK OFFICE
CERTIFICATE OF CORRECTION

PATENT NO.   : 5,157,431
DATED        : October 20, 1992
INVENTOR(S)  : Toshiaki Mabuchi and Koji Takahashi It is certified that error appears in the above-identified patent and that said Letters Patent is hereby corrected as shown below:

Col. 1, line 37.   Change "near focus" to -- near-focus --

Col. 2, line 50.   After "following" insert -- detailed description of embodiments thereof taken in --

Col. 3, line 63.   Change "After that in" to -- In --

Col. 7, line 9.    After "function" insert -- , --

Col. 7, line 21.   After "allowing" insert -- the AF function to be appositely performed by the whole --

Col. 10, line 30.  After "said" insert -- second --

Signed and Sealed this

Fifth Day of October, 1993

Attest:

BRUCE LEHMAN

Attesting Officer    Commissioner of Patents and Trademarks